Figure 1:
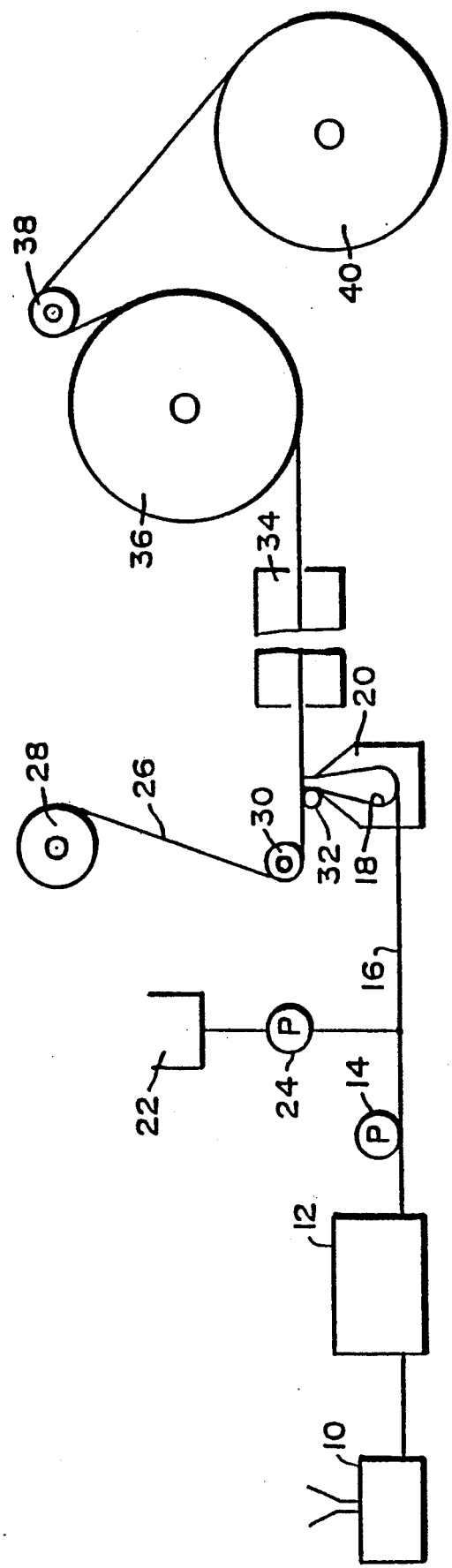

United States Patent [19]

Lulla et al.

[11] Patent Number: 5,322,709
[45] Date of Patent: Jun. 21, 1994

[54] PRODUCTION OF PRESSURE SENSITIVE HOT MELT-ADHESIVE COATED TAPE

[75] Inventors: Jack Lulla, New York; Nilufer Tanrikulu, Tuckahoe, both of N.Y.

[73] Assignee: Tesa Tuck, Inc., New Rochelle, N.Y.

[21] Appl. No.: 875,162

[22] Filed: Apr. 28, 1992

[51] Int. Cl.$^5$ ............................ B05D 5/10; B32B 7/12
[52] U.S. Cl. ............................... 427/208.2; 427/208.4; 428/346; 428/355; 428/343
[58] Field of Search ......................... 427/208.2, 208.4; 428/343, 346, 355

[56] References Cited

U.S. PATENT DOCUMENTS

| | | | |
|---|---|---|---|
| 3,239,478 | 3/1966 | Harlan, Jr. | 428/511 X |
| 3,565,247 | 2/1971 | Brochman | 428/297 X |
| 3,932,328 | 1/1976 | Karpman | 428/512 X |
| 3,986,253 | 10/1976 | Harris | 428/314.4 |
| 4,273,827 | 6/1981 | Sweeney et al. | 428/316.6 |
| 5,034,269 | 7/1991 | Wheeler | 428/354 X |

Primary Examiner—Daniel Zirker
Attorney, Agent, or Firm—Sprung Horn Kramer & Woods

[57] ABSTRACT

In the production of a pressure sensitive adhesive tape comprising the steps of compounding and applying a hot melt adhesive composition to a tape backing, and allowing the hot melt adhesive to cool and thereby solidify to a pressure sensitive adhesive coating on said tape, the improvement which comprises incorporating into the hot melt adhesive composition a blowing agent which does not decompose under the conditions of compounding and application of the hot melt adhesive composition, and thereafter decomposing the blowing agent, thereby to impart to the hot melt coating a cellular structure.

9 Claims, 1 Drawing Sheet

PRODUCTION OF PRESSURE SENSITIVE HOT MELT-ADHESIVE COATED TAPE

The present invention relates to the production of pressure sensitive adhesive tapes.

Pressure sensitive adhesive tapes are used widely as maskings during painting, for sealing cartons, and myriad other uses.

They were traditionally produced by dissolving an adhesive composition in a volatile solvent, applying the solution to a tape backing and then evaporating the solvent to leave a pressure sensitive adhesive coating on the backing.

The products perform satisfactorily, but the process entailed the use of a solvent and the need for evaporation. This involved significant cost and raised the possibility of environmental pollution by the solvent.

Accordingly, there were devised processes for applying the adhesive in the form of a hot melt rather than as a solution. The molten adhesive upon cooling sets to a solid pressure sensitive adhesive.

While such hot melt adhesive tapes are satisfactory for many purposes, they do not perform as well as their solution-produced counterparts in certain uses, exhibiting less desirable physical and performance attributes.

In addition, a larger amount of adhesive is required for even this lesser performance.

It is accordingly an object of the present invention to produce a superior hot melt adhesive pressure sensitive tape which performs as well as or even better than solution applied adhesive tapes.

These and other objects and advantages are realized in accordance with the present invention by modifying the known process for producing such tapes by the known steps of compounding and applying a hot melt adhesive composition to a tape backing, and allowing the hot melt adhesive to cool and thereby solidify to a pressure sensitive adhesive coating on said tape.

In accordance with the invention, such process is modified by incorporating into the hot melt adhesive composition a blowing agent which does not decompose under the conditions of compounding and application of the hot melt adhesive composition, and thereafter decomposing the blowing agent, thereby to impart to the hot melt coating a cellular structure.

A somewhat similar but less cellular structure is characteristic of solution-applied adhesive tapes but much less so of hot melt adhesive tapes without the blowing agent. The cellular structure exhibits itself in superior performance.

It is surprising that the recited process produces a high performing product since other seemingly similar processes were nowhere comparably acceptable. Thus, efforts to incorporate into the melt a blowing agent which decomposed and foamed during the acts of compounding and/or application to the tape backing proved unsuccessful. The melt indeed foamed but, by the time of wind up, the appearance of the hot melt adhesive was substantially the same as when produced from blowing agent-free hot melt adhesive compositions.

The hot melt adhesive composition can be any of those heretofore employed, e.g., a styrene-isoprene-styrene block copolymer compounded with various known additives such as resins, oils, blending agents, and the like. In accordance with a preferred aspect of the present invention, there can be used a composition of a lower melting point than those generally employed heretofore. Heretofore, the melt temperature was generally about 340° to 370° F., but it has been found that compositions melting as low as about 310° F. perform quite satisfactorily.

As employed herein, for example, "melting" and "hot melt" do not necessarily mean a fully liquid mass in the conventional sense. Instead they mean a mass of a viscosity low enough to be processible. To some extent that depends upon the processing equipment but as a general rule of thumb it means a material whose viscosity at the indicated "melt" temperature is at most about 1,000,000 cP, advantageously at most about 500,000 cP and preferably at most about 100,000 cP.

Representative compositions into which blowing agents may be incorporated in accordance with the invention include, but are not limited to, those shown in U.S. Pat. Nos. 3,239,478 and 3,932,328, the disclosures of which are incorporated herein by references.

The concept of incorporating blowing agents in pressure-sensitive adhesives is not limited to hot melt adhesives, but is also applicable with similar advantage to pressure-sensitive adhesives which are coated from aqueous or solvent media.

The blowing agents can be any of those known to decompose at the desired temperatures. However, it has been found that, when formulated into hot melts in accordance with the invention, the blowing agents decompose at somewhat lower temperature than their ratings, apparently determined in uncompounded state.

Suitable blowing agents include azodicarbonamide sold by Uniroyal under the designation Celogen AZ, and preferably p-toluene sulfonyl semicarbazide sold under the designation Celogen RA, particularly mixed with other blowing agents effectively to drop the decomposition temperature of the Celogen RA. Other blowing agents decomposing at about 330° F. and higher can similarly be employed, e.g. 5-phenyl tetrazole itself decomposing above 400° F. but capable of lower decomposition by suitable compounding.

The blowing agent can be mixed dry with the hot melt adhesive composition or can be dissolved or dispersed in a liquid to effect a better distribution through the adhesive with which it is mixed. Advantageously the ingredients making up the hot melt are compounded and then melted, the melt advancing to a die where it is applied to the backing. The blowing agent may be injected into the melt on its way to such die.

Advantageously the blowing agent is present in the hot melt adhesive composition in about 0.1 to 5% by weight, preferably about 0.25 to 2% by weight. Desirably, the blowing agent decomposes at a temperature at least 25° F. higher than the maximum temperature encountered by the hot melt adhesive composition during compounding and application, the tape after hot melt coating being subjected to a temperature sufficient to decompose the blowing agent.

The backing to which the hot melt adhesive composition is applied can be any sheet material which will withstand the oven conditions wherein decomposition of the blowing agent is effected, e.g. crepe paper, a flat sheet of paper, high melting plastic film, and the like.

The products of the instant process are characterized by high performance, e.g. quick stick, good holding, and smooth unrolling, i.e. unwinding without jerking.

The invention will be further described with reference to the accompanying drawing which is a flow sheet of a system for producing pressure sensitive hot melt-adhesive coated tapes in accordance with the present invention.

The components making up a hot melt pressure sensitive adhesive composition are charged to a jacketed oil-heated sigma blade mixer 10, thereby forming a hot melt. The melt is fed into a holding tank 12 which discharges into a positive displacement pump 14. The outlet side of the pump discharges into a line 16 which feeds the melt into the cavity 18 of a die 20, the melt leaving the die upwardly.

Blowing agent is advantageously slurried in a liquid non-solvent in tank 22 and by positive displacement pump 24 is positively discharged into line 16 which conveys the hot melt adhesive composition.

If needed, mixing means (not shown) may be provided to ensure uniform distribution of the blowing agent through the melt. In addition the positive displacement pumps 14 and 24 may be interconnected to maintain a fixed discharge ratio, even if outputs are to be changed, i.e. slave-master.

A crepe paper 26 is unwound from a roll 28 and pulled over rollers 30 and 32 and over the die 18 so as to pick up and be coated with the hot melt. The coated paper enters a heating chamber 34 wherein the temperature is raised to decompose the blowing agent. The paper upon leaving the oven passes over a chilled roll 36 to cool the paper after which it passes over a coated direction-changing release roll 38 and is then wound up on a roll 40.

Alternatively, the hot melt pressure sensitive adhesive can be compounded in an extruder on a continuous basis and the blowing agent injected into the extruder which directly supplies the coating die with the necessary adhesive material.

Thereafter the roll may be wound into shorter lengths and/or cut into narrow tapes of conventional width.

The invention will be further described in the following illustrative examples wherein all parts are by weight unless otherwise stated.

EXAMPLE 1

Employing an apparatus as shown in the drawing the blowing agent sold by Uniroyal under the trademark Celogen RA is injected into a pressure sensitive hot melt adhesive composition, the mixture having the following composition in parts by weight:

| | |
|---|---|
| Styrene-isoprene-styrene Polymer - (Kraton 1112) | 100 |
| Antioxidant - (Butyl Zimate) | 2 |
| Antioxidant - (Irganox 1010) | 0.5 |
| Pigment - (TiO₂) | 6 |
| Escorez 1580 Tackifying Resin | 60 |
| Liquid Resin Wingtack 10 | 20 |
| Resin Kolon 90 | 30 |
| Resin Pentalyn H | 30 |
| Cellogen RA Blowing agent | 1.25 |

The adhesive composition is melted at about 310° F. and by the positive displacement pump is pumped to the applicator where it is applied to a crepe paper weighing approximately 40 pounds per 3000 square feet in an amount of 20 pounds per 3000 square feet, the crepe paper moving at a linear speed of about 100 feet per minute.

The coated paper is passed through an oven wherein its temperature is raised to 340° F., directly thereafter passing over a chilled roll which brings its temperature down to about 110° F., and then wound up.

The adhesive surface of the tape under a magnifying glass exhibits a foamed cellular structure characteristic of solution-applied adhesives, low density and superior performance.

EXAMPLE 2

The process of Example 1 was carried out with some slight procedural modifications. Between the coating applicator 18 and the oven 34, the coated tape was chilled and rolled up. Thereafter it was unrolled and introduced into the oven.

Various runs were made with different blowing agents, different conditions of heating (sometimes with no oven), different weights of adhesive, different speeds, all as specified, and the products were measured with regard to performance employing a variety of tests.

The details and results are set forth in Table 1 hereinbelow.

In such table, the various column headings and the text procedures and their results are as follows:

The rolling ball tack test measures the "wet grab" or "quick stick" properties of a pressure sensitive tape, measured by seeing how far a ⅞" stainless steel ball travels on an adhesive surface before it comes to a complete stop. A shorter distance indicates better performance; 46 is the maximum reading.

The box load test measures the ability of a tape to hold closed the flaps of a carton. A longer time indicates better performance; 24 hours is the maximum reading.

In the holding power tests the top one inch of a three inch length of the finished tape, 0.5 inch wide, is pressed tightly onto a stainless steel strip or to cardboard as indicated, and a 1 Kg weight is suspended from the other end. The time for the tape to pull away from the stainless steel or cardboard strip is determined. A longer time indicates better performance; test discontinued after 28 hours for cardboard, after 45 hours for steel.

TABLE

| RUN | TEMP °F. OF TAPE SURFACE IN HEATING CHAMBER 34 | ROLLING BALL TACK, INCHES | BOX LOAD HRS. (TWO MEASUREMENTS) | HOLDING POWER TO CARDBOARD, HRS. (TWO MEASUREMENTS) | HOLDING POWER TO STEEL, HRS. |
|---|---|---|---|---|---|
| 1 | 75 | 27 | 0.15 | 20.8 | 1.8 |
| | | | 0.83 | 3.4 | |
| 2 | 340 | 3 | 6.5 | 21.6 | >45 |
| | | | 6.5 | >28 | |
| 3 | 75 | 46 | 6.5 | 13.5 | 42 |
| | | | 0.9 | >28 | |
| 4 | 340 | 15 | 24 | >28 | >45 |
| | | | | 24 | >28 | |

This table shows that triggering of the blowing agent (Run 2 at 340° F. vs. Run 1 at 75° F.; with a different composition Run 4 at 340° F. vs. Run 3 at 75° F.) results in enhanced performance.

In other runs wherein the blowing agent was triggered prematurely, the product performance was essentially the same as when no blowing agent was included.

It will be appreciated that the instant specification and claims are set forth by way of illustration and not limitation, and that various modifications and changes may be made without departing from the spirit and scope of the present invention.

What is claimed is:

1. In the production of a pressure sensitive adhesive tape comprising the steps of compounding and continuously applying a hot melt adhesive composition to a tape backing, and allowing the hot melt adhesive to cool and thereby solidify to a pressure sensitive adhesive coating on said tape, the improvement which comprises incorporating into the hot melt adhesive composition a blowing agent which does not decompose under the conditions of compounding and application of the hot melt adhesive composition; and which decomposes at a temperature at least 25° F. higher than the maximum temperature of the hot melt adhesive composition during compounding and application, heating the coated tape to a temperature sufficient to decompose the blowing agent, thereby to impart to the hot melt coating a cellular structure, and promptly after decomposition of the blowing agent positively cooling the tape to effect solidification of the hot melt adhesive composition.

2. The process according to claim 1, wherein during compounding and application the hot melt adhesive composition achieves a maximum temperature of about 310° F.

3. The process according to claim 1, wherein the blowing agent is present in the hot melt adhesive composition in about 0.1 to 5% by weight.

4. The process according to claim 1, wherein the blowing agent is present in the hot melt adhesive composition in about 0.25 to 2% by weight.

5. The process according to claim 1, wherein the backing is a crepe sheet.

6. The process according to claim 1, wherein the backing is a flat sheet of paper.

7. The process according to claim 1, wherein the backing is a polymer film.

8. The process according to claim 1, wherein the hot melt adhesive composition consists essentially of a molten polymer, resins, oils and blending agents.

9. The process according to claim 1, wherein the hot melt is applied in about 20 pounds per 3000 square feet of tape backing.

* * * * *